United States Patent [19]

Kalthoff et al.

[11] Patent Number: 4,936,378
[45] Date of Patent: Jun. 26, 1990

[54] APPARATUS FOR STABILIZING A TUBE OF A HEAT EXCHANGER

[75] Inventors: Wolfgang Kalthoff, Laudenbach; Jakob Russ, Römerberg, both of Fed. Rep. of Germany

[73] Assignee: ABB Reaktor GmbH, Mannheim, Fed. Rep. of Germany

[21] Appl. No.: 356,787

[22] Filed: May 25, 1989

[30] Foreign Application Priority Data

May 25, 1988 [DE] Fed. Rep. of Germany ....... 3817654

[51] Int. Cl.⁵ .............................................. F28F 7/00
[52] U.S. Cl. ........................................ 165/69; 138/89; 138/91; 165/76; 165/906
[58] Field of Search ...................... 138/89, 91; 165/69, 165/76, 906

[56] References Cited

U.S. PATENT DOCUMENTS

| | | | |
|---|---|---|---|
| 2,356,987 | 8/1944 | Gallop | 138/89 |
| 3,119,177 | 1/1964 | Knecht | 29/401 |
| 3,820,682 | 6/1974 | Davella | 138/89 X |
| 4,590,991 | 5/1986 | Cooper, Jr. et al. | 165/69 |
| 4,598,738 | 7/1986 | Weber et al. | 138/89 |

FOREIGN PATENT DOCUMENTS

| | | | |
|---|---|---|---|
| 624858 | 1/1936 | Fed. Rep. of Germany | 138/89 |
| WO85/4701 | 10/1985 | PCT Int'l Appl. | 138/89 |
| 4604 | of 1880 | United Kingdom | 138/91 |

*Primary Examiner*—Martin P. Schwadron
*Assistant Examiner*—Allen J. Flanigan
*Attorney, Agent, or Firm*—Herbert L. Lerner; Laurence A. Greenberg

[57] ABSTRACT

Closure plugs have heretofore been required in an apparatus for stabilizing an unstable tube of a heat exchanger with a weakened wall region, in addition to providing a stabilizer. Furthermore, differing inside diameters can often not be bridged with the spreading range of the stabilizer. A rod which is fitted with two axially spaced-apart cam discs is provided in order to achieve not only a vibration-free stabilization but a simple sealing as well. Each cam disc has a spreading sleeve which engages over it. Once the spreading sleeve has been pressed against the inner wall of the tube by a relative rotation of the rod, the sleeve-shaped end of the rod is expanded by rolling or is welded in the tube sheet.

12 Claims, 2 Drawing Sheets

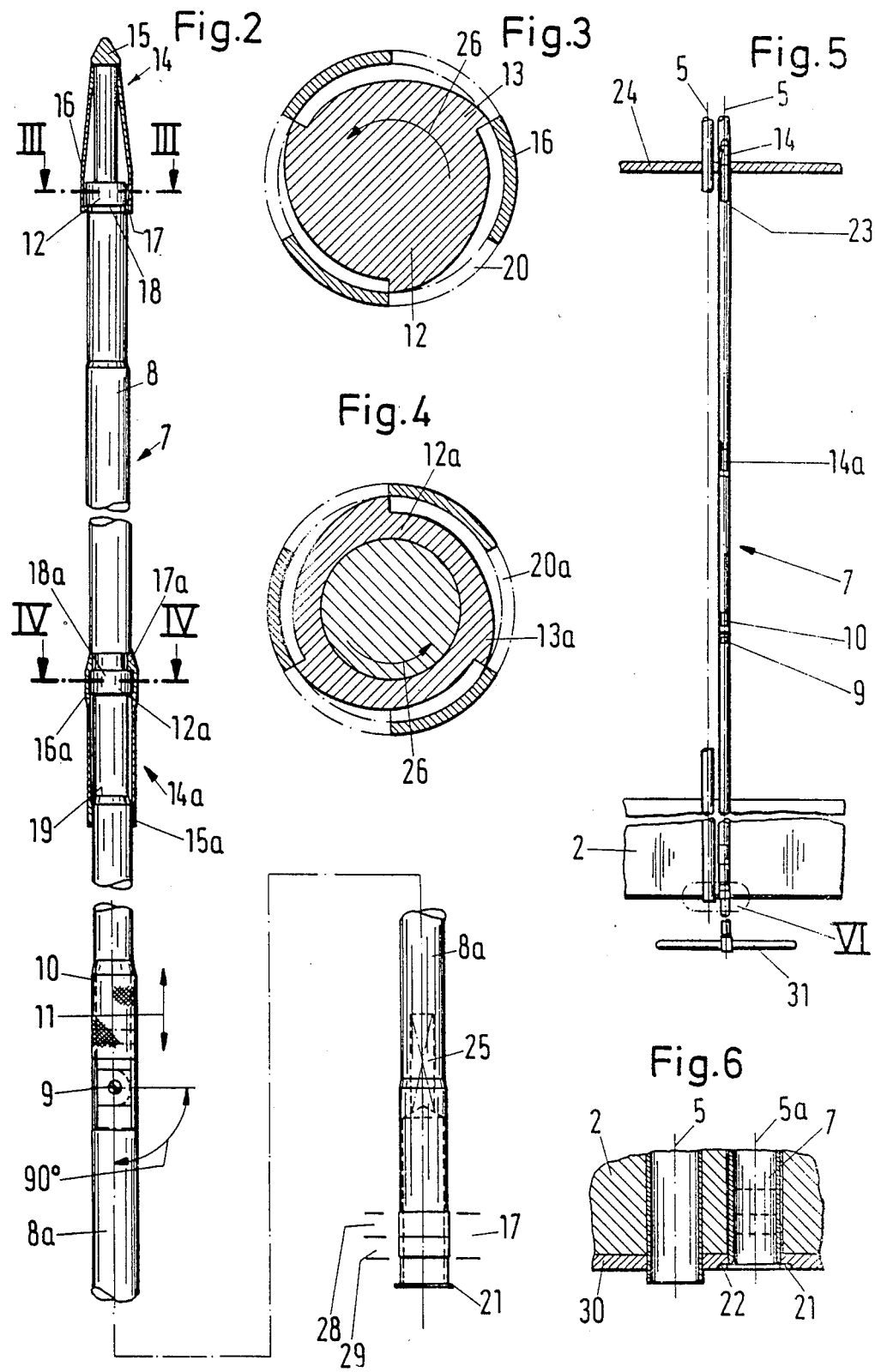

APPARATUS FOR STABILIZING A TUBE OF A HEAT EXCHANGER

The invention relates to an apparatus for stabilizing a tube of a heat exchanger which is unstable due to a weakening in a wall region of the tube and which is accessible from the tube sheet of the heat exchanger, including a rod which is to be inserted into the tube, which carries a spreading sleeve capable of bearing against the inner wall surface of the tube and which is rotatable relative to the spreading sleeve.

Such an apparatus is known from German Published, Non-Prosecuted Application No. DE-OS 37 35 195. In that device, the spreading sleeve does provide a stabilization of the severed tube. However, the additional fitting of a closure plug is necessary in order to achieve a tight closure. The inside diameter, which differs at various points along the extent of the heat exchanger tube, often cannot be bridged with the spreading range of the conventional stabilizer, so that a reliable seating cannot be guaranteed. Finally, the finger acting as centering device hinders the clamping and releasing operation, since it becomes hooked during the turning of the mandrel.

It is accordingly an object of the invention to provide an apparatus for stabilizing a tube of a heat exchanger, which overcomes the hereinafore-mentioned disadvantages of the heretofore-known devices of this general type and which permits not only a sealing of the flow path but also a vibration-free stabilization in the region of the weakening of the wall.

With the foregoing and other objects in view there is provided, in accordance with the invention, an apparatus for stabilizing a tube being accessible from the tube sheet of a heat exchanger and being unstable due to a weakening in a wall region of the tube, comprising a rod to be inserted into a tube, the rod having an end to be associated with the tube sheet in the form of a sleeve for receiving an expanding tool, at least one cam disc being circumferentially disposed on the rod and having a curve profile rising in circumferential direction, and a spreading sleeve being disposed on the rod and secured against axial displacement, the spreading sleeve including a basic body and tongues jutting out from the basic body in axial direction, the spreading sleeve being being engaged over the at least one cam disc in the vicinity of the tongues, the tongues bearing resiliently against the inner circumferential wall surface of the tube when pushing the rod into the heat exchanger tube, and the rod and the at least one cam disc being rotatable relative to the spreading sleeve for pushing the tongues against the inner wall surface of the tube.

Through the use of cam discs, a greater diameter range is bridged with constantly uniform clamping force. With the restoring force which is achieved by the resilient structure of the tongues of the spreading sleeve, it is ensured that the spreading sleeve will not turn with the rod when it rotates. Due to the construction of the lower rod end in the form of a sleeve, once the spreading sleeve has been clamped, the lower end of the stabilizer can be expanded by rolling or welded in the tube sheet. This measure prevents the turning back of the rod, and consequently a releasing of the spreading sleeve, and the heat exchanger tube is tightly sealed. By fixing the closure plug into the rod of the stabilizer, a simple and reliable device is created. If it is necessary at a later time to remove the plug-stabilizer combination, this is possible once the expansion by rolling or the welding has been undone (for example by "shrinking" or machining), by turning the stabilizer in the direction opposite that used in the installation.

In accordance with another feature of the invention, the at least one cam disc is in the form of two cam discs being axially spaced apart on the rod for receiving a point of damage of the tube therebetween.

In accordance with a further feature of the invention, there is provided a collar disposed on the rod, the at least one cam disc being formed in the collar.

In accordance with an added feature of the invention, the at least one cam disc is detachably connected to the rod. With the detachable connection, the stabilizer can be used for various tube diameters.

In accordance with an additional feature of the invention, the at least one cam disc has a plurality of cams of the same pitch. This is done in order to equalize the contact pressure.

In accordance with yet another feature of the invention, the at least one cam disc has a plurality of cams each being associated with a respective one of the tongues. This further increases the equal pressing of the spreading sleeve.

In accordance with yet a further feature of the invention, the rod includes a joint, a sliding sleeve and an extension piece connected to the joint and the sliding sleeve, the extension piece receiving the at least one cam disc and/or having the end of the rod. This is necessary because the length of the stabilizer can be limited by the dimension or structure of the water chamber of a heat exchanger.

In accordance with yet an added feature of the invention, the end of the rod has a polyhedron-shaped axial cutout formed therein for receiving a turning tool. The polyhedron is necessary for receiving the turning tool for the rod.

In accordance with yet an additional feature of the invention, the spreading sleeve has a projection engaging in a groove formed in the rod. This is done in order to ensure that the spreading sleeve is secured against axial displacement.

In accordance with a concomitant feature of the invention, the tongues have roughened outer circumferential surfaces. This feature improves the adhesion of the spreading sleeve.

Other features which are considered as characteristic for the invention are set forth in the appended claims.

Although the invention is illustrated and described herein as embodied in an apparatus for stabilizing a tube of a heat exchanger, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2 is a fragmentary, partly sectional, side-elevational view of the longitudinal extent of a stabilizer;

FIG. 3 is an enlarged cross-sectional view taken along the line III—III of FIG. 2, in the direction of the arrows;

FIG. 4 is an enlarged cross-sectional view taken along the line IV—IV of FIG. 2, in the direction of the arrows;

FIG. 5 is a reduced, fragmentary, partly sectional, side-elevational view of a stabilizer in its installed position; and FIG. 6 is an enlarged, fragmentary, cross-sectional view of the portion VI of FIG. 5.

Figure 1:
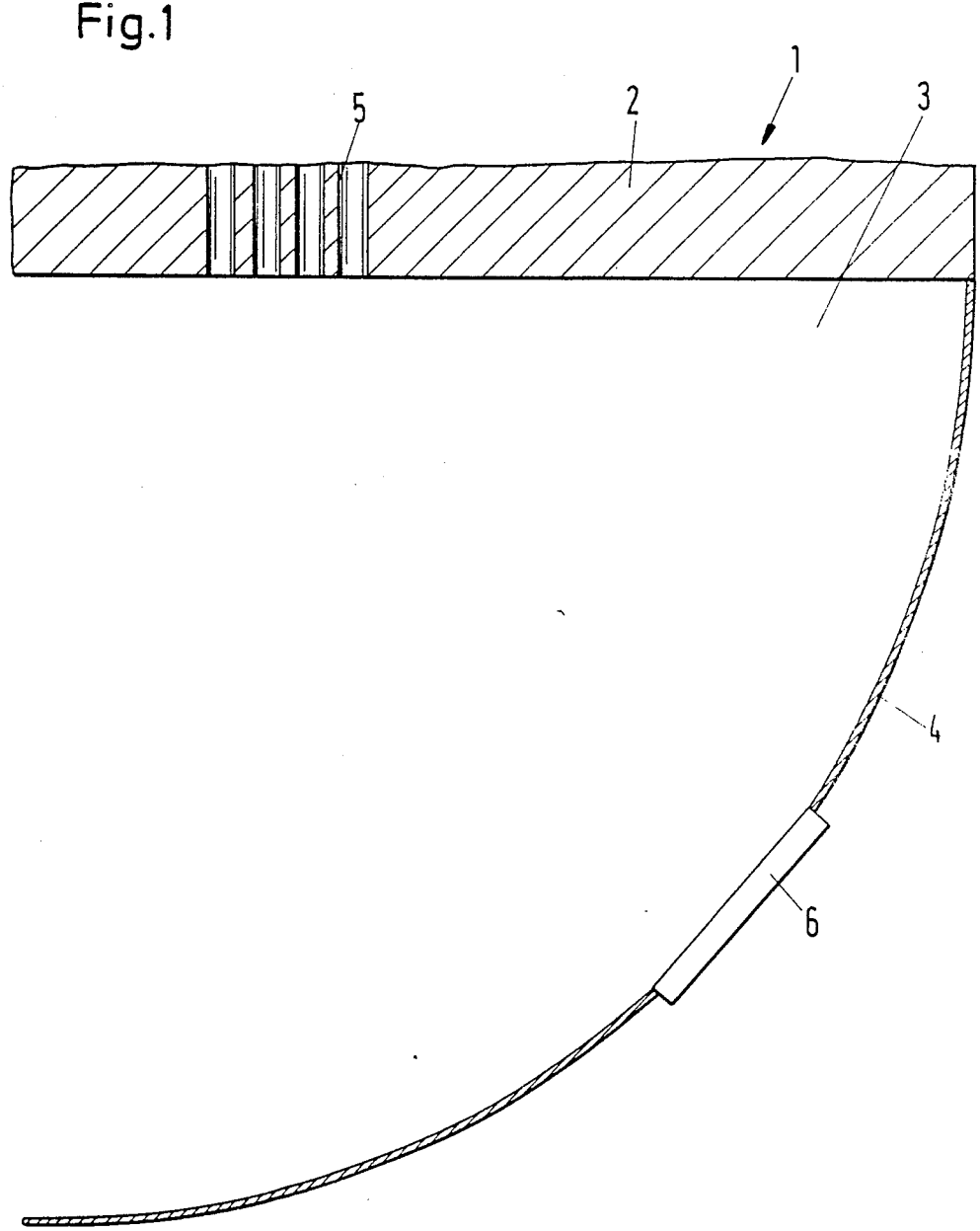
FIG. 1 is a fragmentary, diagrammatic, cross-sectional view of the lower region of a heat exchanger.

Referring now to the figures of the drawing in detail and first, particularly, to FIG. 1 thereof, there is seen a lower region of a heat exchanger 1. A tube sheet 2 adjoins a water chamber 3, which is closed off at the bottom by a hemispherical base 4. Although a plurality of tubes 5 end in the tube sheet 2, only a few are shown. If a damaged or otherwise weakened tube above the tube sheet is to be shut down until it can be repaired or removed in a later inspection phase, a stabilizer 7 shown in FIG. 2 is introduced through a manhole 6 into the water chamber 3 and inserted into the damaged tube, in order to avoid a deflection or swinging of the damaged tube during operation of the heat exchanger.

The stabilizer 7, which is shown in its longitudinal extent in FIG. 2, is formed of a rod 8 which may be bent off by 90° at a joint 9. The bend, which may also be provided at several locations along the rod, makes it possible to introduce stabilizers of any length, irrespective of the dimensions of the water chamber. Once the upper part of the stabilizer 7 has been pushed into a tube 5, an extension piece 8a is folded down and a sliding sleeve 10 is pushed downwards in the direction of an arrow 11. With this safeguard, a rotationally and tensionally fixed connection is established, which makes it possible to insert the stabilizer 7 further into the severed tube. Of course, the stabilizer may also be constructed without a bendable rod 8, i.e. with a one-piece rod 8.

Each of two axially spaced apart points along the rod 8 carries a cam disc 12, 12a. According to FIGS. 3 and 4, the cam discs 12, 12a each have three respective cams 13, 13a distributed with even spacing around the circumference thereof. Each cam 13 has a uniformly rising curve profile. While the cam disc 12 is worked directly into a collar of the rod 8 according to FIG. 3, the cam disc 12a is detachably connected to the rod 8 according to FIG. 4. As can be seen from the upper end of FIG. 2 in conjunction with FIG. 3, a spreading sleeve 14 is engaged over the cam disc 12. The spreading sleeve 14 is formed of a basic body 15, which in this case has a tapered structure for facilitating introduction of the stabilizer, and three tongues 16, which jut out from the basic body 15 in axial direction of the rod 8. The ends of the tongues 16 which engage over the cam disc 12 have claw-shaped projections 17, which protrude into grooves 18 in the rod 8 and effect a positional securing of the spreading sleeve 14. The axially spaced-apart cam disc 12a is likewise assigned a spreading sleeve 14a which engages over it. A basic body 15a in this case reaches almost up to an edge 19, while tongues 16a extend from the basic body 15a in the direction of the cam disc 12a and beyond the cam disc 12a. The free ends of the resiliently constructed tongues 16a are also in the form of projections 17a in this case, which protrude into a respective groove 18a in each position of the tongues and are thus secured against axial displacement. The tongues 16a of the spreading sleeve 14a are shown in cross section in FIG. 4. It can be seen in both FIG. 3 and FIG. 4 that gaps 20, 20a which are formed between the individual tongues 16, 16a, extend up to the basic bodies 15, 15a. Each tongue is assigned a cam 13, 13a so that the spreading sleeve comes to rest on the inner wall of the tube 5 with an even contact pressure. The outside diameter of each spreading sleeve 14, 14a in the region of the tongues is chosen in such a way that the spreading sleeve is elastically compressed when being pushed into the heat exchanger tube. Due to this restoring force (spring force), the spreading sleeve produces a contact pressure against the heat exchanger tube. The frictional resistance between the tongues which bear resiliently against the inner wall of the tube and the inner wall of the tube itself, in this case is great enough to prevent the spreading sleeve from turning with the rod 8 when it rotates relative to the spreading sleeve. Both the frictional force in the clamping operation and the holding force once the spreading operation has taken place, are increased by roughening the surface of the tongue.

The axial distance between the cam discs 12, 12a is chosen in such a way that once the stabilizer 7 has been pushed in until a flanged rim 21 thereof comes into contact with a cleared or exposed surface 22 of the tube sheet 2, a point of damage 23 to be stabilized must come to rest between the spreading sleeves 14, 14a, as seen in FIGS. 2, 5 and 6. FIG. 5 shows a partial region of the tube sheet 2 and of a spacer 24 disposed above the tube sheet, with two of several thousand heat exchanger tubes 5 of a heat exchanger 1. A stabilizer 7 has entered into one of the two tubes, up to the flanged rim 21. The upper spreading sleeve 14 is placed just above the point of damage 23, while the lower spreading sleeve 14a is disposed at a relatively large distance below the point of damage 23. The joint 9 with the sliding sleeve 10 can be seen underneath the spreading sleeve 14a. A turning tool 31 shown in FIG. 5 engages in a polyhedron-shaped axial cutout 25 formed in the end of the rod, as shown in FIG. 2. By turning the rod 8 in the direction of an arrow 26 seen in FIGS. 3 and 4, the tongues 16, 16a are pressed against the inner wall of the tube 5 by the cams 13, with a contact pressure which actually far exceeds the resilient bearing of the tongues.

Once the spreading sleeves are clamped, in order to secure their stabilizing position and to seal the tube, the lower rod end is expanded by rolling in the region of the tube sheet 2. For this purpose, the lower end of the rod 8 is constructed in the form of a sleeve. In order to achieve a satisfactory connection, a rolling expansion zone or sleeve 27 of the rod 8 is formed of a surface region 28 with a lesser surface hardness and a surface region 29 with a greater surface hardness, than the tube 5. Since the surface region 29 additionally has a roughening, a form-locking connection between the surface region 29 and the tube 5 is produced as well as a force-locking connection between the surface region 28 and the tube 5. A form-locking connection is one which connects two elements together due to the shape of the elements themselves, as opposed to a force-locking connection, which locks the elements together by force external to the elements.

FIG. 6 is on an enlarged scale and shows the tube sheet 2 with an undamaged tube 5 which protrudes to a certain extent beyond a plating 30, as well as a tube 5a provided with a stabilizer 7. In order to obtain a planar contact surface for the flanged rim 21 of the stabilizer, the projecting tube part must be worked or machined off, until the surface 22 on the plating 30 is produced. The polyhedron 25 for receiving the turning tool 31 extends from the bottom of the sleeve-shaped end of the rod 8 upwards in axial direction.

The foregoing is a description corresponding in substance to German Application No. P 38 17 654.8, dated May 25, 1988, the International priority of which is being claimed for the instant application, and which is hereby made part of this application. Any material discrepancies between the foregoing specification and the aforementioned corresponding German application are to be resolved in favor of the latter.

We claim:

1. Apparatus for stabilizing a tube being accessible from the tube sheet of a heat exchanger and being unstable due to a weakening in a wall region of the tube, comprising a rod to be inserted into a tube, said rod having an end to be associated with the tube sheet in the form of a sleeve for receiving an expanding tool, at least one cam disc being circumferentially disposed on said rod and having a curve profile rising in circumferential direction, and a spreading sleeve being disposed on said rod and secured against axial displacement, said spreading sleeve including a basic body and tongues jutting out from said basic body in axial direction, said spreading sleeve being being engaged over said at least one cam disc in the vicinity of said tongues, said tongues bearing resiliently against the inner circumferential wall surface of the tube when pushing said rod into the heat exchanger tube, and said rod and said at least one cam disc being rotatable relative to said spreading sleeve for pushing said tongues against the inner wall surface of the tube.

2. Apparatus according to claim 1, wherein said at least one cam disc is in the form of two cam discs being axially spaced apart on said rod for receiving a point of damage of the tube therebetween.

3. Apparatus according to claim 1, including a collar disposed on said rod, said at least one cam disc being formed in said collar.

4. Apparatus according to claim 1, wherein said at least one cam disc is detachably connected to said rod.

5. Apparatus according to claim 1, wherein said at least one cam disc has a plurality of cams of the same pitch.

6. Apparatus according to claim 1, wherein said at least one cam disc has a plurality of cams each being associated with a respective one of said tongues.

7. Apparatus according to claim 1, wherein said rod includes a joint, a sliding sleeve and an extension piece connected to said joint and said sliding sleeve, said extension piece receiving said at least one cam disc.

8. Apparatus according to claim 1, wherein said rod includes a joint, a sliding sleeve and an extension piece connected to said joint and said sliding sleeve, said extension piece having said end of said rod.

9. Apparatus according to claim 1, wherein said rod includes a joint, a sliding sleeve and an extension piece connected to said joint and said sliding sleeve, said extension piece receiving said at least one cam disc and having said end of said rod.

10. Apparatus according to claim 1, wherein said end of said rod has a polyhedron-shaped axial cutout formed therein for receiving a turning tool.

11. Apparatus according to claim 1, wherein said tongues have roughened outer circumferential surfaces.

12. Apparatus according to claim 1, wherein said spreading sleeve has a projection engaging in a groove formed in said rod.

* * * * *